May 22, 1956  S. P. BIRD  2,747,160
SHIELDING EFFICIENCY MEASURING DEVICE
Filed Dec. 21, 1951  3 Sheets-Sheet 3

*INVENTOR.*
STANLEY P. BIRD
BY Albert F. Kronman
ATTORNEY

United States Patent Office 2,747,160
Patented May 22, 1956

2,747,160
SHIELDING EFFICIENCY MEASURING DEVICE

Stanley P. Bird, Verona, N. J., assignor to Breeze Corporations, Inc., Newark, N. J., a corporation of New Jersey Application December 21, 1951, Serial No. 262,872

20 Claims. (Cl. 324—58)

This invention relates to a device for measuring the efficiency of shields for ignition wires, such as are used to prevent radio interference in vehicles powered by internal combustion engines.

Although shields for the ignition systems of internal combustion engines have become widely used, it has heretofore been impossible to arrive at any precise measurement whereby the efficiency of the shielding can be determined. In testing completed structures or in determining the relative efficiency of various possible types of shielding, it is of the utmost importance to be able to determine in advance the degree of attenuation which has been achieved by the respective shields. It is also important to be able to measure the amount of leakage in decibels, rather than being compelled to set up some arbitrary standard for use by way of comparison with the various types tested.

In order to make measurements of the attenuation of the signal brought about by a shielding conduit, it is necessary to set up the conditions of test so that the input power within the confines of the conduit can be measured, and the integrated power of the energy that penetrates through the walls of the conduit, can be determined. The attenuation due to the presence of the shield can then be calculated by the well known expression:

$$db = 10 \log \frac{P_2}{P_1}$$

wherein $P_2$ would be the power of the signal source impressed on the input of the device, and $P_1$ would be the power of the leakage coming from the output of the device. Both of these measurements can be made as a voltage using a wide frequency range vacuum tube voltmeter at the input, and a calibrated high sensitivity receiver at the output. The calculated value employing the above equation, would constitute the attenuation of the signal expressed in decibels.

Accordingly, it is an object of the present invention to provide a device for measuring the efficiency of tubular shielding.

Another object of the present invention is to provide a device for measuring the efficiency of tubular shielding directly in decibels.

A further object of the present invention is to provide a shielding tester which will take into consideration both the electric and magnetic fields in its measurements.

Another object of the present invention is to provide a device in which no tuning apparatus is required.

A feature of the present invention is to provide a shielding tester which does not require dipoles and loops to measure the electric and magnetic fields received individually.

Another feature of the present invention is to provide a tester which will not require the use of shielded rooms in order to perform tests.

A further feature of the present invention eliminates the need for super-sensitive receivers for measuring a performance and the total integration of the fields.

Another feature of the present invention is its use of the theory of transmission lines to obtain a definite and fixed relationship between the electric and magnetic fields to simplify the field pattern and consequently the mathematics employed in making shielding efficiency calculations.

A further feature of the present invention is its ability to cover a wide range of frequencies with a minimum of equipment, limited only by the cut-off frequency of the coaxial lines, as set up in the design of the test equipment.

The invention consists of the construction, combination and arrangement of parts, as herein illustrated, described and claimed.

In the accompanying drawings, forming a part hereof, are illustrated two forms of embodiment of the invention, in which drawings similar reference characters designate corresponding parts, and in which.

Figure 1:
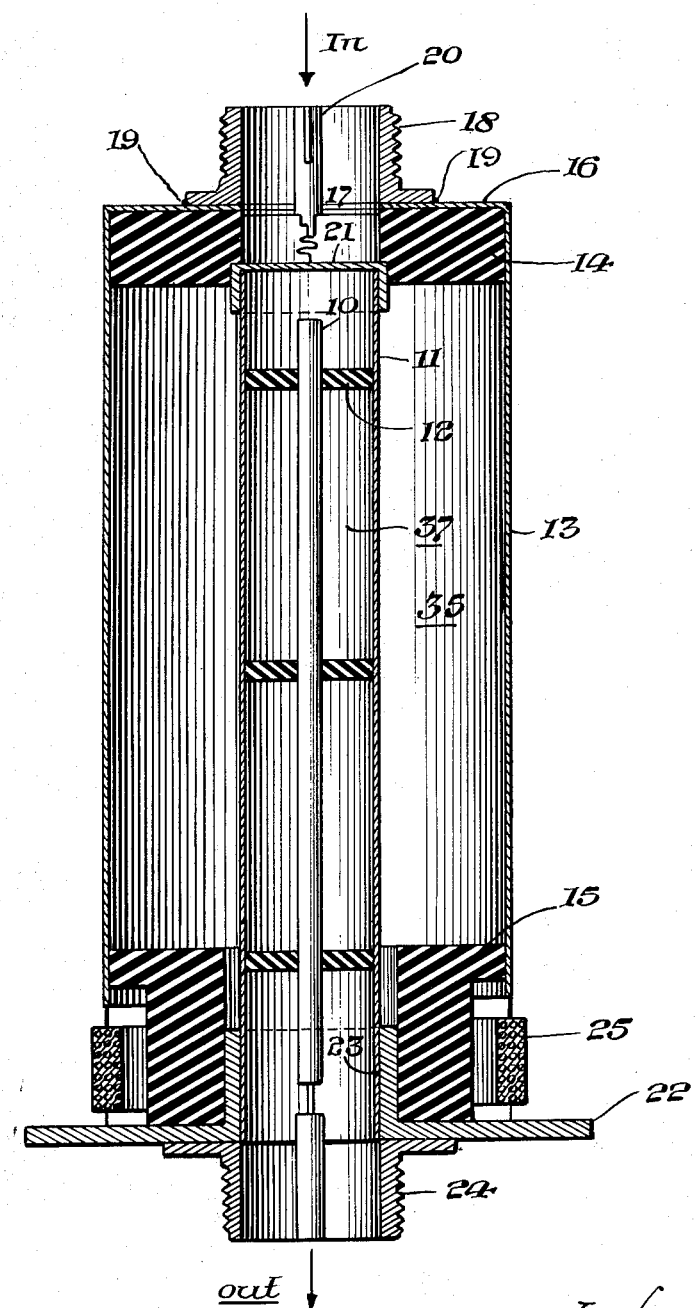
Figure 1 is a vertical section showing one complete embodiment of the measuring device, in accordance with the present invention.

Referring to the drawings, and particularly Figure 1, 10 indicates a conductor axially disposed within a conduit 11, which conduit 11 comprises the shield, the efficiency of which it is desired to test. The conductor 10, which is cylindrical, is maintained equi-distant from the walls of the conduit 11, by means of dielectric washers 12, which may be of polystyrene or any other suitable material. A tubular conductor 13 surrounds the conduit 11, and is maintained concentric therewith, by means of spacers or washers 14, 15. The top of the conductor 13 is partially closed by a flange 16, having an opening 17 therein.

Figure 3:
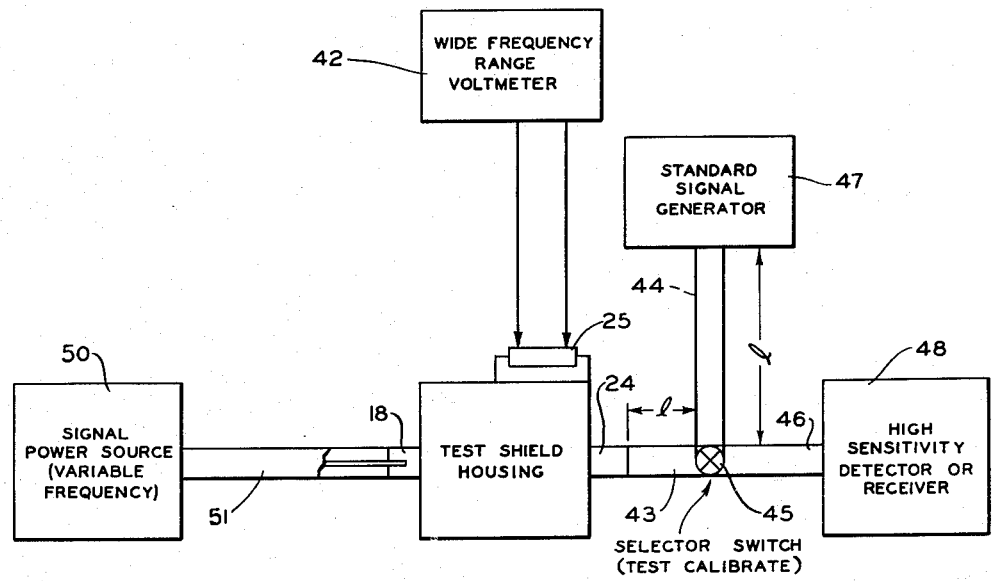
Figure 3 is a somewhat diagrammatic showing of the circuit of a complete embodiment of the device shown in Figure 1.

An input terminal 18 is electrically connected to the flange 16, as by silver-soldering it thereupon at 19. The input terminal 18 is adapted to be connected to an input coaxial line 51 (see Figure 3) coming from a source of power 50. The central transmission line 20 of the coaxial input line 51 is connected to a cap 21, which is silver-soldered to the top of the conduit 11. The conduit 11 thus serves as the central transmission line in the testing section, while the conductor 13 becomes the outer wall of the input co-axial line. The bottom of the conduit 11 is electrically connected to a base plate 22, as by silver-soldering said conduit 11 to the inside diameter of a flange-shaped plate 22, as indicated at 23.

An output terminal 24 is silver-soldered to the bottom of the base plate 22, and is adapted to receive thereon a coupling (not shown), linking the device to a high sensitivity receiver 48.

The end of the conductor 13 nearest the base plate 22 is terminated in a load resistor 25 of a value sufficient to absorb all of the energy of the incoming signal. The power of the signal imposed at the input terminal 18 may be measured using the wide frequency range vacuum tube voltmeter 42, and the power of the signal which reaches the conductor 10 by reason of the leakage through the conduit 11, may be read by the high sensitivity receiver 48, attached to the output terminal 24.

The embodiment shown in Figure 1 would be used, if it is desired, to increase the input power to very high levels, because the resistor 25 can be made of any number of parallel resistors, increasing the power ratings and decreasing the resistance by the factor of the number of resistors.

Figure 2:
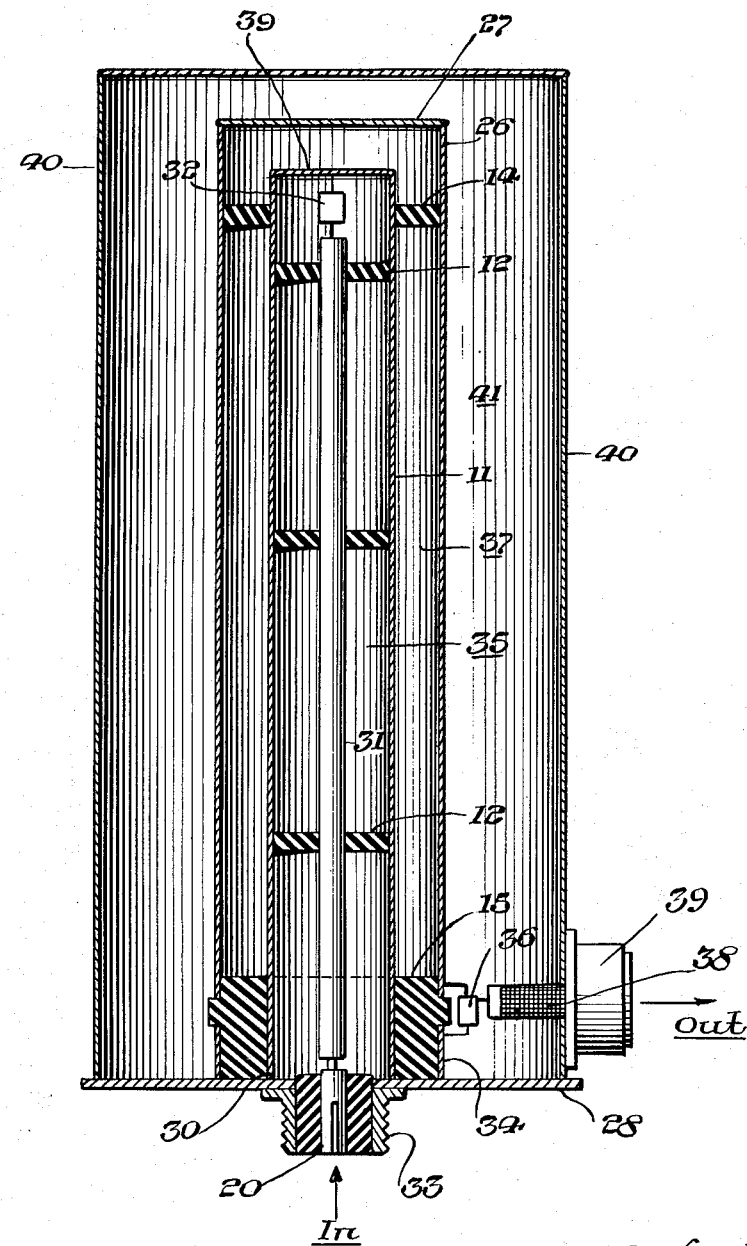
Figure 2 is a vertical section taken through a second embodiment of a shielding measuring device, in accordance with the present invention.
Figure 4:
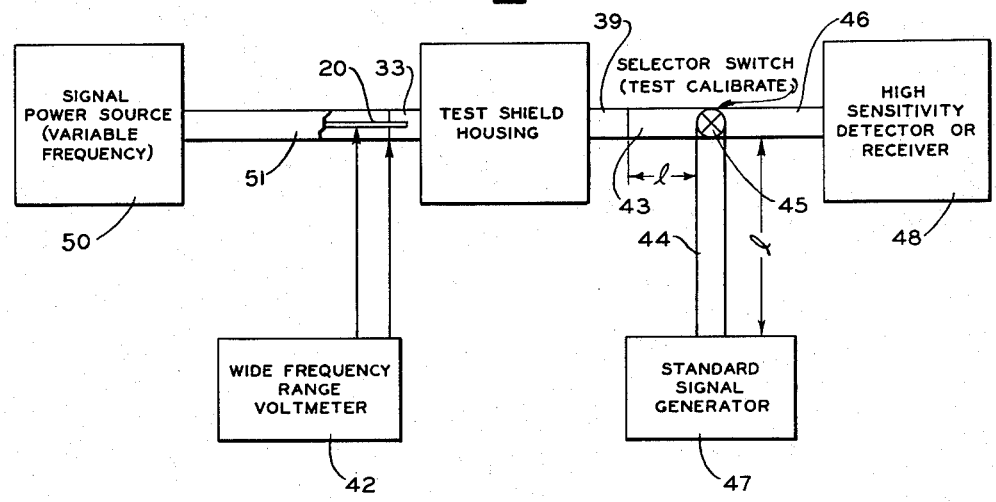
Figure 4 is a somewhat diagrammatic showing of the circuit of the embodiment shown in Figure 2.

Referring to the second embodiment of the invention, shown in Figures 2 and 4, 26 indicates a conductor having a substantially cylindrical shape, closed at the upper end by an electrically conductive disc 27, and being secured at the bottom end to a base plate 28. The conductor 26 is carried upon a dielectric spacer 15, which in turn is secured to the base plate 28 by means of a sleeve 34.

The conduit 11 in Figure 2 is disposed within the conductor 26, and is concentric therewith. The concentricity is maintained by the dielectric spacers or washers 14, 15. The top of the conduit 11 is closed by an electrically conductive disc 39, which is silver-soldered thereon, and the bottom of the conduit 11 is soldered to the base plate 28, as as indicated at 30.

A central solid cylindrical lead 31, coming from the coaxial line 51, is axially disposed within the shield 11, and is maintained equi-distant from the walls of the shield 11 by washers 12. The upper end of the line 31 terminates in a terminal resistor 32, and the lower end of the line 31 passes through an input terminal 33, which is silver-soldered to the outside of the base plate 28.

The ratio of the inside diameter of the conduit to be tested 11, and the outside diameter of the line 31, are selected so that the characteristic surge impedance of this section of the device, measured at the input terminal 33, is equal to the surge impedance of the coaxial line 51 used to feed a signal from a transmitter 47. The terminal resistor 32 must be capable of absorbing all of the energy of the incoming signal, and must also equal the surge impedance of the line. The line and chamber 35 of the unit will then have a constant voltage dependent on the surge impedance selected, and the power that is employed, such that $$P = \frac{E^2}{Z_0}$$

The mode of transmission is transversely electro-magnetic, whereby the electric field is radial, and the magnetic field follows a pattern of concentric circles about the conductor, both vectors in a plane normal to the concentric axis.

In accordance with the theory of such transmission lines, the power transmitted is the total integration of the electric and magnetic fields existing between the conduit 11 and the lead 31 in Figure 2, and the conduit 11 and the conductor 13 in Figure 1.

In Figure 2, a resistor 36 is provided as a termination for the section of the device numbered 37, which consists of the chamber between the surface of the conduit 11, and the pick-up conductor 26. The resistor 36 is only necessary when the line 38 connected to the output terminal 39 of the device, and the input impedance of the receiver 48 are of relatively high impedance. If the receive input impedance is constant and equal to the surge impedance of the connecting line and chamber 37 of the device, the resistor 36 is not necessary. The input to the receiver from the terminal 39 of the device can then be calibrated directly in microvolts.

An external shield 40 is provided in the embodiment shown in Figure 2, to eliminate stray interfering noise or signals which might enter the device and cause erroneous leakage measurements. The shield 40 is not required in the embodiment shown in Figure 1, since the power supplied to the chamber 35 is so very much higher than any possible interfering noise or signal. The output terminal 39 is silver-soldered to the outer wall of the shield 40 in Figure 2. It is imperative that all metal-to-metal joints be soldered in the construction of the devices shown in Figures 1 and 2, in order that stray leakages can not pass over the surface of the unit and find their way into the output connections 24 and 39.

In connection with the structure shown in Figure 2, it is necessary that the parallel surge impedance of the two chambers 37 and 41 are equal to the resistance value of the resistor 36 in order to absorb the total energy passing through the shield 11 from the chamber 35 to the chamber 37. Here again, if the receiver 48 terminates the line 46 coming from the output terminal 39, the resistor 36 is not necessary. If the receiver 48 represents a sufficiently high impedance, the resistor 36 will be required.

From the foregoing descriptions, the operation of the shielding testing devices will be seen to be as follows: The signal is fed into the device, in each of the embodiments shown, by way of the input terminal. As a result of the method of fabrication and shielding ability of the material employed, some energy will pass through the conduit or shield 11, being tested, into the chamber 37 in each figure of the drawings. This energy will then follow the same field configuration that exists in chamber 35, i. e., the transverse electro-magnetic mode, so that the electric field induced is radial and the magnetic field also is represented by concentric circles. This field pattern is likewise integrated so that the total power passing through the shield 11 is a function of the electric and magnetic fields.

The power passing through the shield 11 is picked up by the cylindrical conductors 10 and 26 in the devices shown in Figures 1 and 2 respectively, to which conductors there is attached, as previously described, a high sensitivity receiver 48. From a calculation based upon the power at the input terminal of the testing device, as compared with the power reaching the receiver, the efficiency of the shield in the testing device may be calculated directly.

It will thus be seen that, regardless of the ratio of the magnitude of the electrical and magnetic fields, both of their vectors are considered in the measurement of the power on either side of the shield. As a result, a rigorous determination of shielding efficiency is obtained.

Having thus fully described the invention, what is claimed as new and desired to be secured by Letters Patent of the United States, is:

1. A device for measuring the shielding efficiency of an ignition wire covering structure of tubular shape comprising, a base plate, said plate being provided with an opening therein, a first cylindrical conductor overlying the plate and its opening, normal to but spaced from said plate, a second cylindrical conductor lying within the first conductor and concentric therewith, a length of shielding material to be tested disposed around and spaced from the second conductor and within the first conductor concentric with both of said conductors, a source of power connected to the first conductor, a signal receiver connected to the second conductor through the opening in the plate, a device for measuring the amount of electrical potential entering the first conductor associated with the said first conductor, and calibrated means associated with the receiver to measure the power of the signal penetrating the material to be tested and reaching the second conductor.

2. A device for measuring the shielding efficiency of an ignition wire covering structure of tubular shape comprising, a base plate, said plate being provided with an opening therein, a first cylindrical conductor overlying the plate and its opening, normal to but spaced from said plate, a second cylindrical conductor lying within the first conductor and concentric therewith, a length of shielding material to be tested disposed around and spaced from the second conductor and within the first conductor, dielectric washers between the conductors and the shielding material disposed so as to maintain the shielding material concentric with both of said conductors, a source of power connected to the first conductor, a signal receiver connected to the second conductor through the opening in the plate, a device for measuring the amount of electrical potential entering the first conductor associated with the said first conductor, and calibrated means associated with the receiver to measure the power of the signal penetrating the material to be tested and reaching the second conductor.

3. A device for measuring the shielding efficiency of an ignition wire covering structure of tubular shape comprising, a base plate, said plate being provided with an opening therein, a first cylindrical conductor overlying the plate and its opening, normal to but spaced from said plate, a second cylindrical conductor lying within the first conductor and concentric therewith, a length of shielding material to be tested disposed around and spaced from the second conductor and within the first conductor, dielectric washers between the conductors and the shielding material disposed so as to maintain the shielding material concentric with both of said conductors, a dielectric spacing washer between the output end of the first conductor and base plate, a signal receiver connected to the second conductor through the opening in the plate, a device for measuring the amount of electrical potential entering the first conductor associated with the said first conductor, and calibrated means associated with the receiver to measure the power of the signal penetrating the material to be tested and reaching the second conductor.

4. A device for measuring the shielding efficiency of an ignition wire covering structure of tubular shape comprising, a base plate, said plate being provided with an opening therein, a first cylindrical conductor overlying the plate and its opening, normal to but spaced from said plate, an inwardly disposed flange partially closing the input end of said conductor, a second cylindrical conductor lying within the first conductor and concentric therewith, a length of shielding material to be tested disposed around and spaced from the second conductor and within the first conductor concentric with both of said conductors, a source of power connected to the flange of the first conductor, a signal receiver connected to the second conductor through the opening in the plate, a device for measuring the amount of electrical potential entering the first conductor associated with said first conductor, and calibrated means associated with the receiver to measure the power of the signal penetrating the material to be tested and reaching the second conductor.

5. A device for measuring the shielding efficiency of an ignition wire covering structure of tubular shape comprising, a base plate, said plate being provided with an opening therein, a first cylindrical conductor overlying the plate and its opening, normal to but spaced from said plate, an inwardly disposed flange partially closing the input end of said conductor, a terminal resistor connected to the output end of the first conductor, a second cylindrical conductor lying within the first conductor and concentric therewith, a length of shielding material to be tested disposed around and spaced from the second conductor and within the first conductor concentric with both of said conductors, a source of power connected to the flange of the first conductor, a signal receiver connected to the second conductor through the opening in the plate, a device for measuring the amount of electrical potential entering the first conductor associated with the said first conductor, and calibrated means associated with the receiver to measure the power of the signal penetrating the material to be tested and reaching the second conductor.

6. A device for measuring the shielding efficiency of an ignition wire covering structure of tubular shape comprising, a base plate, said plate being provided with an opening therein, an output terminal carried upon the outside surface of the plate underlying the opening in the plate, a first cylindrical conductor overlying the plate and its opening, normal to but spaced from said plate, an inwardly disposed flange partially closing the input end of said conductor, an input terminal carried upon the outside surface of the flange overlying the opening in the flange, a second cylindrical conductor lying within the first conductor and concentric therewith, a length of shielding material to be tested disposed around and spaced from the second conductor and within the first conductor concentric with both of said conductors, a source of power connected to the input terminal on the flange of the first conductor, a signal receiver connected to the second conductor through the output terminal upon the opening in the plate, a device for measuring the amount of electrical potential entering the first conductor associated with said first conductor, and calibrated means associated with the receiver to measure the power of the signal penetrating the material to be tested and reaching the second conductor.

7. A device for measuring the shielding efficiency of an ignition wire covering structure of tubular shape comprising, a base plate, said plate being provided with an opening therein, an output terminal carried upon the outside surface of the plate underlying the opening in the plate, a first cylindrical conductor overlying the plate and its opening, normal to but spaced from said plate, an inwardly disposed flange partially closing the input end of said conductor, a terminal resistor connected to the output end of the first conductor, a second cylindrical conductor lying within the first conductor and concentric therewith, a length of shielding material to be tested disposed around and spaced from the second conductor and within the first conductor, an electrically conductive cap closing the input end of the shielding material, dielectric washers between the conductors and the shielding material disposed so as to maintain the shielding material concentric with both of said conductors, a dielectric spacing washer between the cap and the first conductor, a source of power connected to the input terminal on the flange of the first conductor, a signal receiver connected to the second conductor through the output terminal upon the opening in the plate, a device for measuring the amount of electrical potential entering the first conductor associated with the said first conductor, and calibrated means associated with the receiver to measure the power of the signal penetrating the material to be tested and reaching the second conductor.

8. A device for measuring the shielding efficiency of an ignition wire covering structure of tubular shape comprising, a base plate, said plate being provided with an opening therein, an output terminal carried upon the outside surface of the plate underlying the opening in the plate, a first cylindrical conductor overlying the plate and its opening, normal to but spaced from said plate, an inwardly disposed flange partially closing the input end of said conductor, an input terminal carried upon the outside surface of the flange overlying the opening in the flange, a terminal resistor connected to the output end of the first conductor, a second cylindrical conductor lying within the first conductor and concentric therewith, a length of shielding material to be tested disposed around and spaced from the second conductor and within the first conductor, an electrically conductive cap closing the input end of the shielding material, dielectric washers between the conductors and the shielding material disposed so as to maintain the shielding material concentric with both of said conductors, a dielectric spacing washer between the output end of the first conductor and the base plate, a dielectric spacing washer between the cap and the first conductor, a source of power, a first coaxial line leading from the source of power, said line having its outer conductor connected to the input terminal on the flange of the first conductor and its inner conductor connected to the cap upon the shielding material, a signal receiver, a second coaxial line leading to the signal receiver, said second coaxial line havings its central lead connected to the second conductor near the output terminal upon the opening in the plate and its outer conductor connected to the said output terminal, a device for measuring the amount of electrical potential entering the first conductor associated with the said first conductor, and calibrated means associated with the receiver to measure the power of the signal penetrating the material to be tested and reaching the second conductor.

9. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a second cylindrical conductor overlying the first and concentric therewith for substantially the entire length of said first conductor, said second conductor being spaced from the plate, a length of shielding material to be tested disposed around and spaced from the first conductor concentric with both conductors, said shielding being in electrically conductive contact at its lower end with the base plate, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

10. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a second cylindrical conductor overlying the first and concentric therewith for subustantially the entire length of said first conductor, said second conductor being spaced from the plate, a length of shielding material to be tested disposed around and spaced from the first conductor concentric with both conductors, said shielding being in electrically conductive contact at its lower end with the base plate, dielectric washers between the conductors and the shielding material disposed so as to maintain the concentricity thereof, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

11. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a second cylindrical conductor overlying the first and concentric therewith for substantially the entire length of said first conductor, said second conductor being spaced from the plate, a length of shielding material to be tested disposed around and spaced from the first conductor concentric with both conductors, said shielding being in electrically conductive contact at its lower end with the base plate, a cup shaped external shield overlying the second conductor, said shield being in electrically conductive contact with the plate along its entire open end, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

12. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a second cylindrical conductor overlying the first and concentric therewith for substantially the entire length of said first conductor, said second conductor being spaced from the plate, a length of shielding material to be tested disposed around and spaced from the first conductor concentric with both conductors, said shielding being in electrically conductive contact at its lower end with the base plate, dielectric washers between the conductors and the shielding material disposed so as to maintain the concentricity thereof, a dielectric spacing washer between the bottom of the second conductor and the base plate, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

13. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a second cylindrical conductor overlying the first and concentric therewith for substantially the entire length of said first conductor, said second conductor being spaced from the plate, an electrically conductive disc closing the upper end of the second conductor, a length of shielding material to be tested disposed around and spaced from the first conductor concentric with both conductors, an electrically conductive disc closing the upper end of the shielding material, said shielding being in electrically conductive contact at its lower end with the base plate, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

14. A device for measuring the shielding efficiency of an ignition wire covering structure of tubular shape comprising, a base plate, said plate being provided with an opening therein, a first cylindrical conductor disposed in normal relationship to the upper surface of the plate, above the plate opening, a terminal resistor connected to the output end of the first conductor, a second cylindrical conductor overlying the first and concentric therewith for substantially the entire length of said first conductor, said second conductor being spaced from the plate, a length of shielding material to be tested disposed around and spaced from the first conductor concentric with both conductors, said shielding being in electrically conductive contact at its lower end with the base plate, a source of power connected to the first conductor, through the opening in the plate, a signal receiver connected to the second conductor, a device for measuring the amount of electrical potential entering the first conductor associated with the said first conductor, and calibrated means associated with the receiver to measure the power of the signal penetrating the shielding material and reaching the second conductor.

15. A device for measuring the shielding efficiency of an ignition wire covering structure of tubular shape comprising, a base plate, said plate being provided with an opening therein, an input terminal carried upon the underside of the plate overlying the opening therein, a first cylindrical conductor disposed in normal relationship to the upper surface of the plate, above the plate opening, a second cylindrical conductor overlying the first and concentric therewith for substantially the entire length of said first conductor, said second conductor being spaced from the plate, a length of shielding material to be tested disposed around and spaced from the first conductor concentric with both conductors, said shielding being in electrically conductive contact at its lower end with the base plate, a cup shaped external shield overlying the second conductor, said shield being in electrically conductive contact with the plate along its entire open end, an output terminal carried upon the outer surface of the external shield, a source of power connected to the first conductor, through the opening in the plate, a signal receiver connected to the second conductor, a device for measuring the amount of electrical potential entering the first conductor associated with the first conductor, and calibrated means associated with the receiver to measure the power of the signal penetrating the shielding material and reaching the second conductor.

16. A device for measuring the shielding efficiency of an ignition wire covering structure of tubular shape comprising, a base plate, said plate being provided with an opening therein, an input terminal carried upon the underside of the plate overlying the opening therein, a first cylindrical conductor disposed in normal relationship to the upper surface of the plate, above the plate opening, a terminal resistor connected to the output end of the first conductor, a second cylindrical conductor overlying the first and concentric therewith for substantially the entire length of said first conductor, said second conductor being spaced from the plate, an electrically conductive disc closing the upper end of the second conductor, a length of shielding material to be tested disposed around and spaced from the first conductor concentric with both conductors, an electrically conductive disc closing the upper end of the shielding material, said shielding being in electrically conductive contact at its lower end with the base plate, dielectric washers between the conductors and the shielding material disposed so as to maintain the concentricity thereof, a dielectric spacing washer between the bottom of the second conductor and the base plate, a cup shaped external shield overlying the second conductor, said shield being in electrically conductive contact with the plate along its entire open end, an output terminal carried upon the outer surface of the external shield, a source of power, a first coaxial line leading from the source of power, said line having its outer conductor connected to the input terminal and its inner lead to the first conductor through the opening in the plate, a signal receiver, a second coaxial line leading to the signal receiver, said second coaxial line having its central lead connected to the second conductor, and its outer conductor connected to the output terminal, a device for measuring the amount of electrical potential entering the first conductor associated with the said first conductor, and calibrated means associated with the receiver to measure the power of the signal penetrating the shielding material and reaching the second conductor.

17. A device for measuring the shielding efficiency of tubular, ignition wire, covering structure comprising, a base plate, said base plate being adapted to receive thereon and normal thereto a suitable length of the tubular shielding material to be tested, a first cylindrical conductor axially disposed within the shielding material for substantially the entire length thereof, a second cylindrical conductor overlying and concentric with the shield structure and extending for substantially the entire length of the shield structure, a sensitive signal receiver connected to the second conductor, a device for measuring the amount of electrical potential entering the first conductor, associated with the said first conductor, and calibrated means associated with the receiver to measure the power of the signal reaching the second conductor.

18. A device for measuring the shielding efficiency of tubular, ignition wire, covering structure comprising, a base plate, said base plate being adapted to receive thereon and normal thereto a suitable length of the tubular shielding material to be tested, a first cylindrical conductor axially disposed within the shielding material for substantially the entire length thereof, a terminal resistor at the output end of the first conductor, a second cylindrical conductor overlying and concentric with the shield structure and extending for substantially the entire length of the shield structure, a sensitive signal receiver connected to the second conductor, a device for measuring the amount of electrical potential entering the first conductor, associated with the said first conductor, and calibrated means associated with the receiver to measure the power of the signal reaching the second conductor.

19. A device for measuring the shielding efficiency of tubular, ignition wire, covering structure comprising, a base plate, said base plate being adapted to receive thereon and normal thereto a suitable length of the tubular shielding material to be tested, a first cylindrical conductor axially disposed within the shielding material for substantially the entire length thereof, a second cylindrical conductor overlying and concentric with the shield structure and extending for substantially the entire length of the shield structure, washers and spacers disposed between the conductors and the tubular shielding material to maintain concentricity of said members, a sensitive signal receiver connected to the second conductor, a device for measuring the amount of electrical potential entering the first conductor, associated with the said first conductor, and calibrated means associated with the receiver to measure the power of the signal reaching the second conductor.

20. A device for measuring the shielding efficiency of tubular, ignition wire, covering structure comprising, a base plate, said base plate being adapted to receive thereon and normal thereto a suitable length of the tubular shielding material to be tested, a first cylindrical conductor axially disposed within the shielding material for substantially the entire length thereof, a terminal resistor at the output end of the first conductor, a second cylindrical conductor overlying and concentric with the shield structure and extending for substantially the entire length of the shield structure, washers and spacers disposed between the conductors and the tubular shielding material to maintain concentricity of said members, a sensitive signal received connected to the second conductor, a device for measuring the amount of electrical potential entering the first conductor, associated with the said first conductor, and calibrated means associated with the receiver to measure the power of the signal reaching the second conductor.

References Cited in the file of this patent

UNITED STATES PATENTS

| | | |
|---|---|---|
| 2,376,101 | Tyzzer | May 15, 1945 |
| 2,421,784 | Haeseler et al. | June 10, 1947 |
| 2,446,195 | Shive | Aug. 3, 1948 |
| 2,519,407 | Shive | Aug. 22, 1950 |